(12) United States Patent
Hans

(10) Patent No.: US 11,353,348 B2
(45) Date of Patent: Jun. 7, 2022

(54) METHOD AND MEASURING ASSEMBLY FOR MEASURING LAYER THICKNESS AND SOUND VELOCITY IN SINGLE- OR MULTILAYERED SAMPLES USING ULTRASOUND, WITHOUT A PRIORI KNOWLEDGE OF THE OTHER VARIABLE

(71) Applicant: Flexim Flexible Industriemesstechnik GmbH, Berlin (DE)

(72) Inventor: Sven Hans, Hamburg (DE)

(73) Assignee: Flexim Flexible Industriemesstechnik GmbH, Berlin (DE)

( * ) Notice: Subject to any disclaimer, the term of this patent is extended or adjusted under 35 U.S.C. 154(b) by 214 days.

(21) Appl. No.: 16/845,816

(22) Filed: Apr. 10, 2020

(65) Prior Publication Data
US 2020/0240821 A1    Jul. 30, 2020

Related U.S. Application Data

(63) Continuation of application No. PCT/EP2018/077002, filed on Oct. 4, 2018.

(30) Foreign Application Priority Data

Oct. 11, 2017   (EP) .................................. 17195986

(51) Int. Cl.
*G01F 1/667* (2022.01)
*G01B 17/02* (2006.01)
(Continued)

(52) U.S. Cl.
CPC ........... *G01F 1/667* (2013.01); *G01B 17/025* (2013.01); *G01F 1/663* (2013.01); *G01N 29/041* (2013.01)

(58) Field of Classification Search
CPC . G01F 1/667; G01F 1/663; G01F 1/02; G01B 17/025; G01N 29/041;
(Continued)

(56) References Cited

U.S. PATENT DOCUMENTS

| 4,398,421 A | 8/1983 | White |
| 5,349,860 A | 9/1994 | Nakano et al. |

(Continued)

FOREIGN PATENT DOCUMENTS

| DE | 3441894 A1 | 7/1986 |
| DE | 102010037981 A1 | 4/2012 |

OTHER PUBLICATIONS

International Search Report dated Nov. 16, 2018 of international application PCT/EP2018/077002 on which this application is based.

*Primary Examiner* — Tarun Sinha
(74) *Attorney, Agent, or Firm* — Walter Ottesen, P.A.

(57) ABSTRACT

The disclosure relates to a measurement of the wall thickness of samples such as pipes, containers or panels in which the interior or underside is inaccessible and to a measurement of the layer thickness of coatings or linings of the samples. Disclosed are special measuring arrangements using ultrasonic transmitters and ultrasonic receivers with pitch-catch and pulse-echo configurations, and the associated method for determining the wall thickness without prior knowledge of the sound velocity in the sample. Measuring individual layer thicknesses of a multilayered system without prior knowledge of their sound velocities is also disclosed. The method and the measuring arrangement allow the wall thickness to be measured independently of the knowledge of the sound velocity of the sample. This reduces the measurement uncertainty for the wall thickness and inner diameter of the pipe and thus reduces the measurement uncertainty for a clamp-on ultrasonic flow meter.

14 Claims, 7 Drawing Sheets

(51) Int. Cl.
*G01F 1/663* (2022.01)
*G01N 29/04* (2006.01)

(58) Field of Classification Search
CPC ... G01N 2291/011; G01N 2291/02854; G01N 2291/044
See application file for complete search history.

(56) References Cited

U.S. PATENT DOCUMENTS

| | | | |
|---|---|---|---|
| 6,035,717 A | | 3/2000 | Carodiskey |
| 6,070,466 A | * | 6/2000 | Taran ................ G01B 17/02 73/620 |
| 6,883,376 B2 | | 4/2005 | He |
| 2004/0250624 A1 | | 12/2004 | Abbate et al. |
| 2006/0191342 A1 | | 8/2006 | Renzel |
| 2014/0020478 A1 | | 1/2014 | Ao et al. |
| 2015/0068311 A1 | * | 3/2015 | Tanaka ................ G01B 17/02 73/629 |

* cited by examiner

US 11,353,348 B2

METHOD AND MEASURING ASSEMBLY FOR MEASURING LAYER THICKNESS AND SOUND VELOCITY IN SINGLE- OR MULTILAYERED SAMPLES USING ULTRASOUND, WITHOUT A PRIORI KNOWLEDGE OF THE OTHER VARIABLE

CROSS REFERENCE TO RELATED APPLICATIONS

This application is a continuation application of international patent application PCT/EP2018/077002, filed Oct. 4, 2018, designating the United States and claiming priority from European application 17195986.9, filed Oct. 11, 2017, and the entire content of both applications is incorporated herein by reference.

FIELD OF THE INVENTION

The disclosure relates to measuring the wall thickness of pipes, containers or plates (referred to below as sample) in which the inner side or underside is inaccessible. Additionally, the disclosure is concerned with measurement of the layer thickness of coatings or linings of these samples. Special measuring arrangements using ultrasonic transmitters and receivers in pitch-catch and pulse-echo configuration are disclosed, and also the associated method for determining the wall thickness without prior knowledge of the speed of sound in the sample.

BACKGROUND OF THE INVENTION

The need for measurement of wall thicknesses without access to the inner side arises for example in clamp-on ultrasonic flow measurement, in which the flow sensor is strapped to an existing pipe of unknown wall thickness. Measurement of wall thicknesses without access to the interior is also necessary in nondestructive testing, however, for example, for determining the pressure resistance of containers.

The accuracy of clamp-on ultrasonic flow measurements is substantially influenced by the uncertainty of the pipe internal diameter. The external diameter of a pipe can be measured easily and accurately using a measuring tape. In order to calculate the internal diameter from the external diameter, the wall thickness of the pipe needs to be known. An error in the wall thickness determination ultimately continues in the measurement error in the volume flow. The wall thickness determination therefore needs to take place as precisely as possible. On account of a clamp-on flow measurement being intervention-free, it is only possible for the wall thickness or the internal diameter to be measured mechanically using a micrometric screw gauge or Vernier caliper in rare cases.

The prior art is based on the measurement of the wall thickness with an ultrasonic wall thickness gauge (WDM) using the pulse-echo method either with one sound transducer element (the transmitter and the receiver are an identical element) or with two sound transducer elements (pitch-catch configuration). This method involves an ultrasonic pulse being transmitted into the sample perpendicularly to the sample surface. The pulse is repeatedly reflected in the sample (pipe wall or container wall, plate). Each echo is picked up by the receiver of the ultrasonic wall thickness gauge. From the pulse interval within the echo sequences and with knowledge of the speed of sound in the sample, it is then possible to determine the wall thickness. In order to obtain a sufficiently accurate result, the speed of sound needs to be known a priori. As a rule, the speed of sound is estimated only on the basis of a rough estimate of the material and on the basis of tabulated values. In the case of steel samples, the variation in the speeds of sound of different steel grades can mean that the estimate is 2% different than the true value. Temperature-related divergences in the pipe wall speed of sound have no allowance at all made for them (100° C. temperature difference leads to a speed of sound error of approximately 1%). In the case of materials other than steel, such as cast iron or plastics, the estimation error can be far greater. Erroneous estimations of the speeds of sound continue directly as measurement errors for the wall thickness. If this measurement uncertainty is considered in the clamp-on flow measurement, then a wrong estimate of 2% for the pipe wall thickness in the case of large pipes (for example DN1000, 25 mm wall thickness) leads to a flow measurement error of 0.2%. In the case of small and thick-walled pipes (for example 4" SCH 120), the error in the flow measurement rises to 1%.

The U.S. Pat. No. 6,883,376 B2 discloses a method for measuring an unknown pipe wall thickness without knowledge of its speed of sound. As a departure from the invention presented here, the method uses an immersion and transmission method. The method requires the pipe that is to measured to be filled with water and immersed into a water bath. This method is not suitable for measuring existing vessels or pipes in an installation without removing them.

If a conventional wall thickness gauge (WDM) is used on a coated or lined pipe or for a multilayer system, echo sequences from every single layer are generally superimposed, which means that they are no longer readily evaluable to determine wall thickness. In the case of specific layer-thickness and speed-of-sound circumstances of the individual layers, although the echo sequences can be evaluated (for example thin plastic coating on a thick steel pipe wall), the individual layer thicknesses cannot be determined on the basis of the prior art without prior knowledge of the speeds of sound of the individual layers.

To measure hidden layers or else multilayer systems, the patents US 2006191342 A1 and U.S. Pat. No. 4,398,421 A present different measuring arrangements comprising ultrasonic transducers. The presented measuring arrangements are configured such that the sample is tested using longitudinal and surface waves at the same time. In both cited cases, the speeds of sound of the wave types used need to be known in order to determine the layer thicknesses. U.S. Pat. No. 6,070,466 A relates to the measurement of a multilayer system that consists exclusively of different metals. The separate, oblique sound transducers produce transverse waves and an optional measuring arrangement produces longitudinal waves. In order to determine the layer thicknesses using this method, it is necessary for the speeds of sound in the individual layers to be known. The same applies to determining a layer hidden by a coating in accordance with the U.S. Pat. No. 5,349,860 A, and the method for pipe-wall and coating-thickness measurement described in U.S. Pat. No. 6,035,717 A.

SUMMARY OF THE INVENTION

It is an object of the invention to measure the wall thickness of a sample (for example pipe wall, container wall or plate) independently of the knowledge of speed of sound for this sample. A further object is to measure the thickness of individual layers of a multilayer system (for example pipe wall with coating or lining) without prior knowledge of their speeds of sound.

A method and a measuring assembly or arrangement that allow the wall thickness to be measured independently of the knowledge of the speed of sound for the sample (for example pipe wall, container wall or plate) are described below. This leads to reduced measurement uncertainty for the wall thickness and internal diameters of the pipe and hence to reduced measurement uncertainty for a clamp-on ultrasonic flowmeter. The method allows individual layer thicknesses of a multilayer system (for example pipe wall with coating or lining) to be measured without prior knowledge of their speeds of sound.

According to the disclosure, the layer thickness and speed of sound of at least one layer in a single- or multilayer sample are measured via ultrasound by measuring time-of-flight differences for ultrasonic signals that travel through the sample on at least two different sound paths. To this end, the sound paths run at different angles at the same speed of sound in the same layer of the sample. The sound paths are produced by virtue of the surface of the single- or multilayer sample having at least one coupling body arranged on it with at least two sound transducers or transceivers. The sound transducers or transceivers transmit the ultrasonic signals into the sample through the coupling body on the two different sound paths and receive the reflected ultrasonic signals again. The ultrasonic signals each include a sequence of echoes that arise as a result of multiple reflection inside the sample. The echoes each travel on a different number of the sound paths in the sample. The time-of-flight differences are the intervals of time between successive echoes, wherein the layer thickness and the speed of sound in the layer are calculated using formulae (1.1) and (1.2), which are explained in more detail in the embodiment.

Measuring arrangements having different beam angles determine different times of flight in the sample by measuring the pulse intervals within an echo sequence. The first time-of-flight difference is calculated as the position of a first secondary maximum of an autocorrelation function of an echo sequence, wherein the echo sequence consists of ultrasonic signals that have traveled from the sound transducer at a first angle with respect to the perpendicular of the sample surface through the sample and back to the sound transducer by means of n back-wall reflections through the layer to be measured in the sample and back to the sound transducer by means of n back-wall reflection through the sample at least n times and n+1 times. The second time-of-flight difference is calculated in equal measure, but as the position of a first secondary maximum of an autocorrelation function of an echo sequence consisting of ultrasonic signals that have traveled from the sound transducer at a second angle with respect to the perpendicular of the sample surface through the layer to be measured in the sample and back to the sound transducer by means of n back-wall reflections through the sample at least n times and n+1 times.

For a further embodiment of the method, switching-on and switching-off of individual piezo-elements of an active sound transducer surface area of the sound transducers, which contains multiple piezo-elements, will result in transmitted ultrasonic signals passing through the sample on the two sound paths at least twice and received again by the sound transducers.

For an at least two-layer sample, switching-on and switching-off of individual piezo-elements of an active sound transducer surface area of the sound transducers results in the layer thickness and the speed of sound being determined for each individual layer. It is particularly advantageous if the upper layer of the sample has a lower acoustic impedance than the lower layer.

A measuring arrangement according to the disclosure for measuring the thickness and speed of sound of a single- or multilayer sample is provided via ultrasound and can use the method cited above. The surface of the sample has a coupling body arranged on it with at least two sound transducers. The sound transducers are arranged on the coupling body at a defined angle, so that the ultrasound enters the sample through the coupling body at a beam angle and passes through at least two sound paths in a layer of the sample and from there is reflected back to the at least two sound transducers.

The basic shape of the coupling body is a cuboid and its upper top face has beveled longitudinal lateral edges.

For a further embodiment, the sample or individual layers of the sample has or have reflectors arranged on it or them, so that transmitted ultrasonic signals pass through the sample on the sound paths at least twice and are received again by the sound transducers.

For a further embodiment, at least two sound transducers are arranged on the coupling body at a defined angle and one sound transducer is arranged perpendicularly to the sample surface.

For a further embodiment, at least two sound transducers are arranged in the form of clamp-on flow sensors and one sound transducer is arranged in the form of an ultrasonic wall thickness gauge.

For a further embodiment, two transmitter/receiver pairs comprising two sound transducers each are arranged on the coupling body at different angles, so that a first transmitter/receiver pair is at an angle with respect to the sample surface that is different than the angle of the second transmitter/receiver pair.

For one embodiment, the sound transducers include sound transducer arrays having one or more piezo-elements. An active sound transducer surface area of the sound transducers can be defined by switching-on and switching-off of individual piezo-elements.

The method disclosed in this invention leads to more accurate wall thickness measurement than is possible on the basis of the prior art when speeds of sound for a sample are unknown or known only with uncertainties.

In this regard, the present disclosure presents multiple measuring arrangements, as a result of which the superimposition of the echo sequences for specific multilayer systems can be avoided and hence the individual layer thicknesses can be measured without prior knowledge of the individual speeds of sound for the layers.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
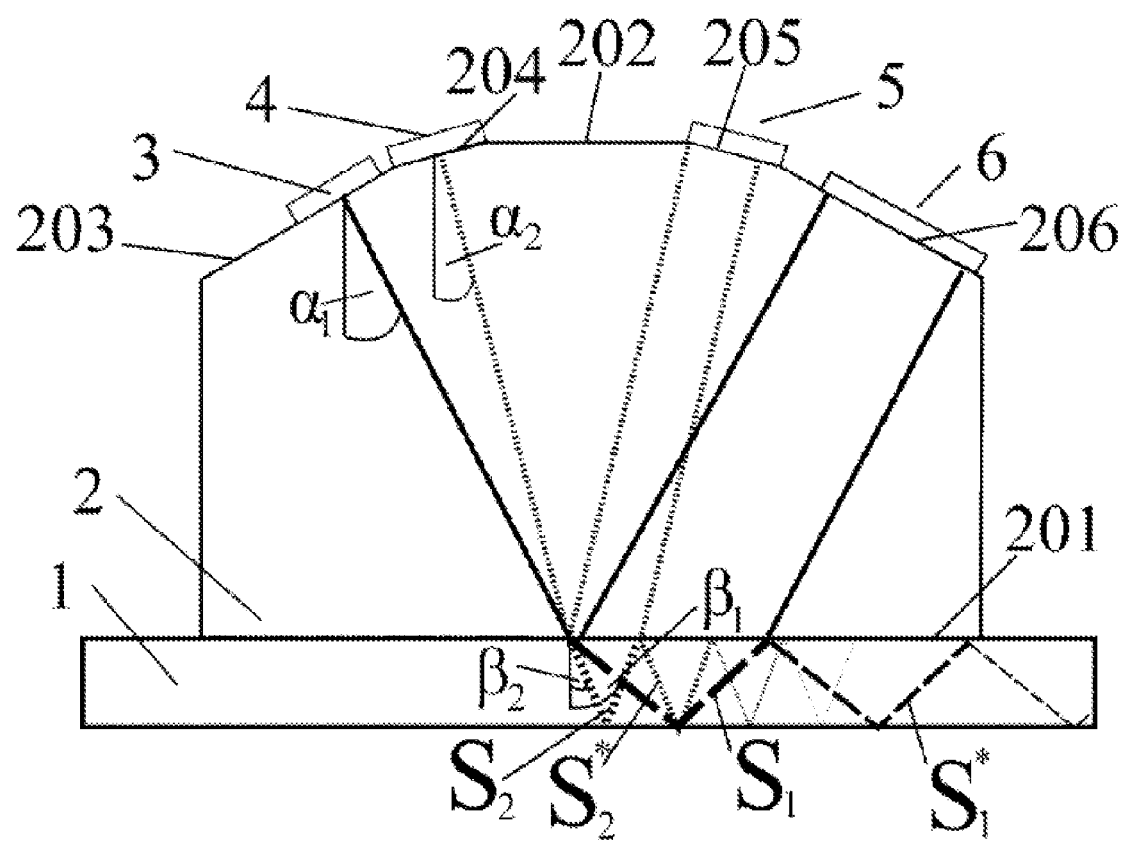
FIG. 1 shows a first embodiment of the measuring arrangement for determining the speed of sound and wall thickness of a sample.

FIGS. 1, 2, 3 and 4 show possible embodiments of a measuring arrangement for determining the speed of sound and layer thickness of the sample 1. A coupling body 2 having the basic shape of a cuboid with beveled longitudinal lateral edges 203, 204, 205, 206 of an upper top face 202 rests on the surface of the sample 1. The coupling face 201 of the coupling body 2 is acoustically coupled to the sample 1 by using a suitable (for example liquid) coupling means. In the figures, identical reference signs are used for identical arrangements.

The sound transducers are arranged on the coupling body 2. In principle, all sound transducers can be embodied as sound transducer arrays, that is, they can consist of one or more piezo-elements, which means that the active sound transducer surface area can be changed by switching the piezo-elements on and off. The sound transducers are oriented at different angles with respect to the sample surface, so that transmitted ultrasonic signals pass through the sample 1 on sound paths $S_1$ and $S_2$ at least twice and are received again by the sound transducers.

FIG. 1 shows that ultrasound is routed through the coupling body 2 from a sound transducer 3 to sound transducer 6 at a beam angle $\alpha_1$ and from a sound transducer 4 to sound transducer 5 at a beam angle $\alpha_2$, so that the ultrasonic waves pass through the sample 1 on the sound paths $S_1$ and $S_2$ at least once on the way from the transmitter to the receiver. In FIG. 1, sound transducer 3 is arranged on the first longitudinal lateral edge 203 as transmitter and is connected to the sound transducer 6, which is arranged on a second longitudinal lateral edge 206, which is opposite the first longitudinal lateral edge 203, as receiver, wherein the ultrasonic waves run on the sound path $S_1$. The sound transducer 4 is connected to the first longitudinal lateral edge 204 as transmitter to sound transducer 5, which is arranged on a second longitudinal lateral edge 205, which is opposite the first longitudinal lateral edge 204, as receiver, via the sound path $S_2$.

Figure 2:
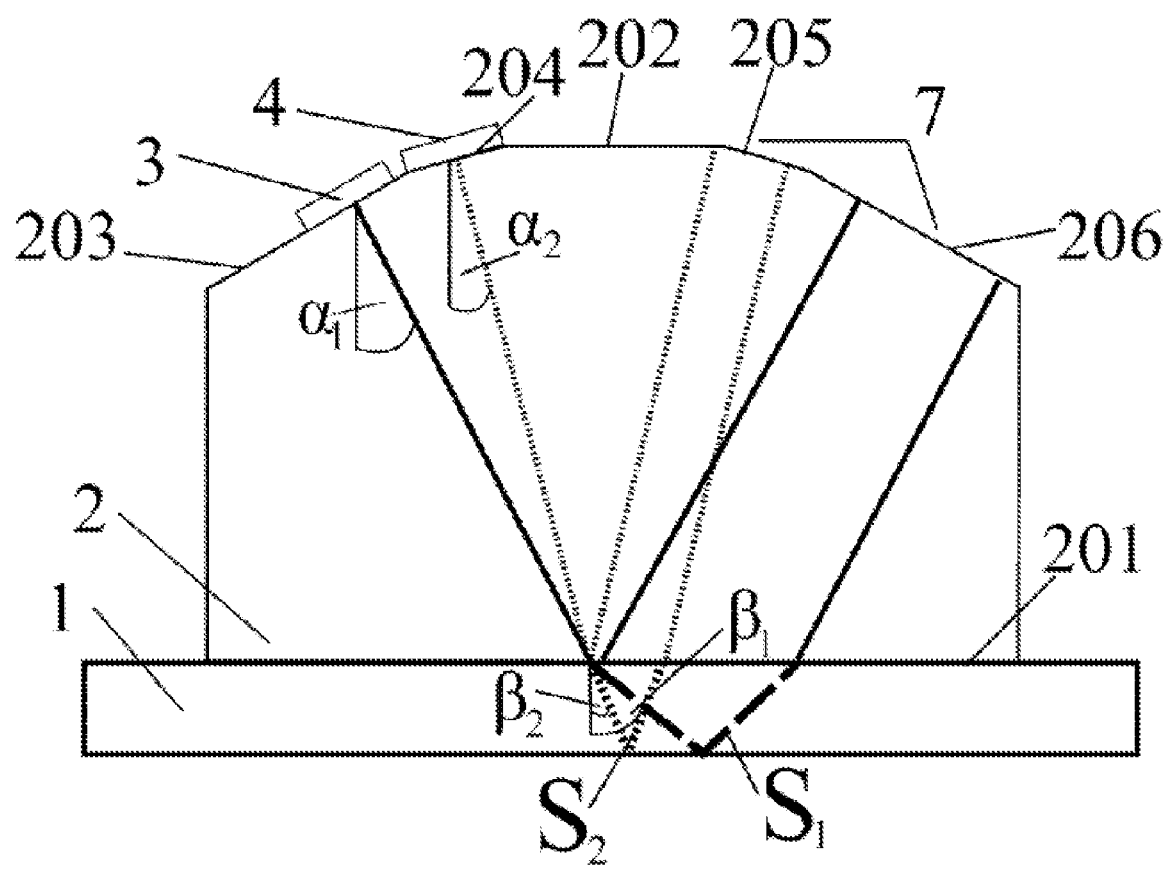
FIG. 2 shows a second embodiment of the measuring arrangement for determining the speed of sound and wall thickness of a sample.

In FIG. 2, only two sound transducers 3 and 4 are arranged on the respective first longitudinal lateral edges 203, 204 of the coupling body 2. The ultrasonic signals transmitted by these sound transducers 3 and 4 at the beam angle $\alpha_1$ and $\alpha_2$ are received again by the same sound transducers 3 and 4, since they are reflected back again by reflectors 7 arranged on the two longitudinal lateral edges 205, 206 of the coupling body 2.

Figure 3:
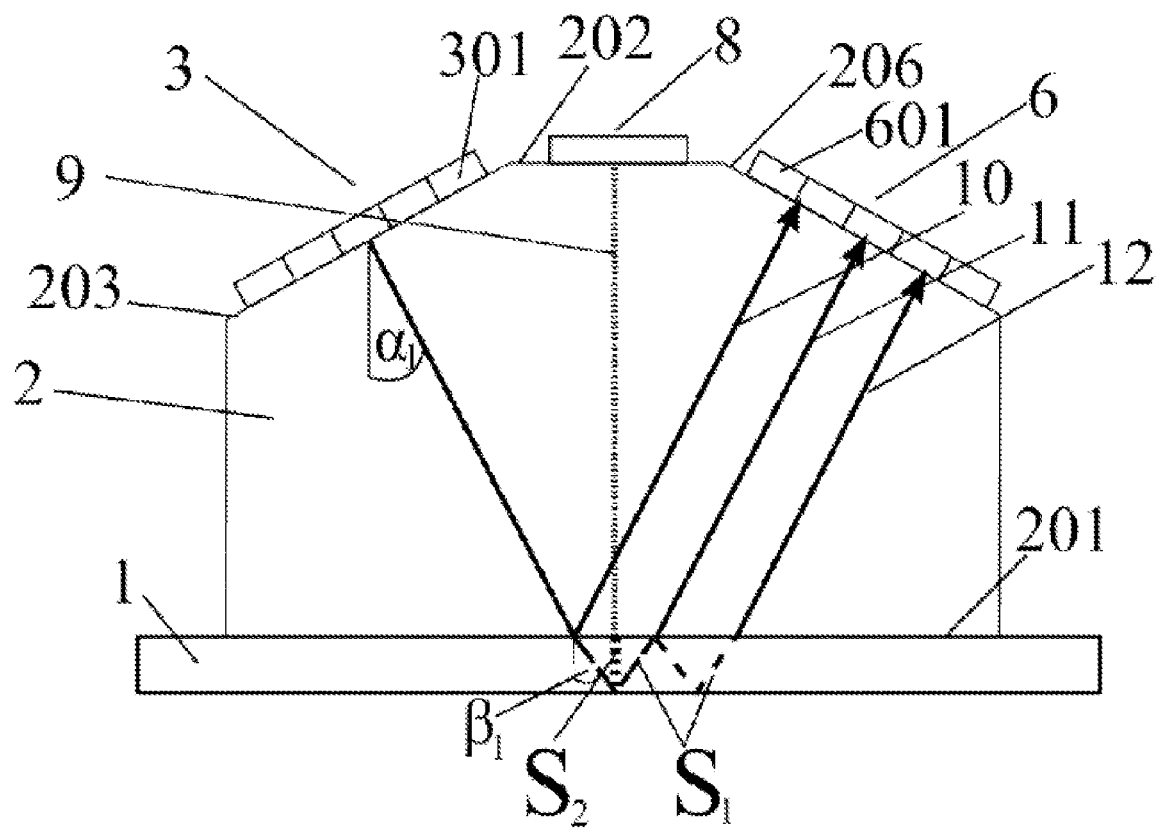
FIG. 3 shows a third embodiment of the measuring arrangement for determining the speed of sound and wall thickness of a sample.

FIG. 3 shows the sound paths necessary for determining the layer thickness of the sample 1 without knowledge of a speed of sound of the transmitted ultrasonic signals. In this embodiment, the coupling body 2 has two longitudinal lateral edges 203, 206 on which the sound transducers 3 and 6 are arranged. The piezo-elements 301 of sound transducer 3 and the piezo-elements 601 of sound transducer 6 are active. The sound transducer 3 transmits an ultrasonic pulse that is reflected by the sample 1 at a beam angle $\alpha$ through the coupling body 2 in accordance with sound path 10 and reaches the receiver 6. A portion of the ultrasonic pulse is transmitted into the sample 1, reflected there by the inner side at an angle $\beta$ and routed to the receiver 6 (sound path 11). Further reflections inside the sample 1 result in further, delayed ultrasonic pulses reaching the receiver 6 (shown in exemplary fashion by sound path 12). Besides this "oblique arrangement" of sound transducers 3 and 6, the upper top face 202 of the coupling body 2, which runs parallel to the coupling face 201, has a sound transducer 8 arranged on it in a "perpendicular arrangement". The associated sound path 9 runs perpendicularly to the sample 1 and is depicted as a dashed line. Sound transducer 8 transmits an ultrasonic pulse through the coupling body 2 into the sample 1. The ultrasonic pulse is repeatedly reflected in the sample 1 and an echo sequence gets back to the sound transducer 8, which picks up this echo sequence as a receiver.

Figure 4:
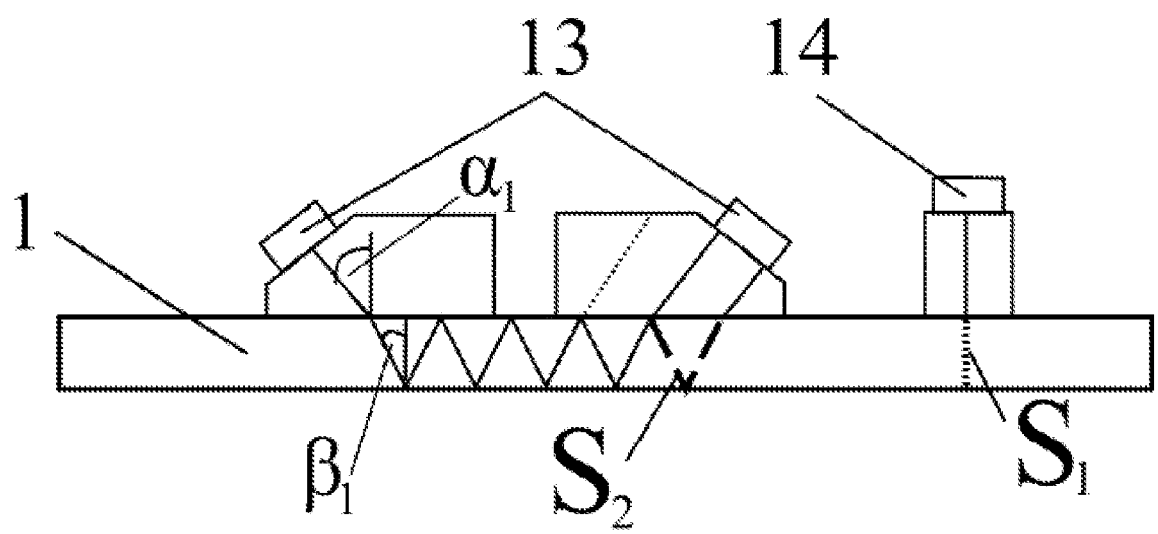
FIG. 4 shows a fourth embodiment of the measuring arrangement for determining the speed of sound and wall thickness of a sample.

FIG. 4 shows a measuring arrangement with conventional clamp-on flow sensors as sound transducers 13 by means of two coupling bodies 2 and an additionally arranged conventional ultrasonic wall thickness gauge as sound transducer 14 for determining the wall thickness of the sample 1 without prior knowledge of the speed of sound in the sample 1. In this case, the sound transducers 13 form the "oblique arrangement" depicted in FIG. 3 with one or more piezo-elements 131, and the separate sound transducer 14 forms the "perpendicular arrangement" with one or more piezo-elements 141. The clamp-on flow sensors (sound transducers 13) need to excite the same wave type in the sample as the ultrasonic wall thickness gauge (sound transducer 14). Typical clamp-on flow sensors (sound transducers 13) produce transverse waves in a steel sample, and therefore a transverse wave ultrasonic wall thickness gauge needs to be used. If the arrangement from FIG. 4 is used on a plastic sample, on the other hand, the clamp-on flow sensors produce longitudinal waves in the sample 1 and it is necessary to use a longitudinal wave ultrasonic wall thickness gauge.

Figure 5:
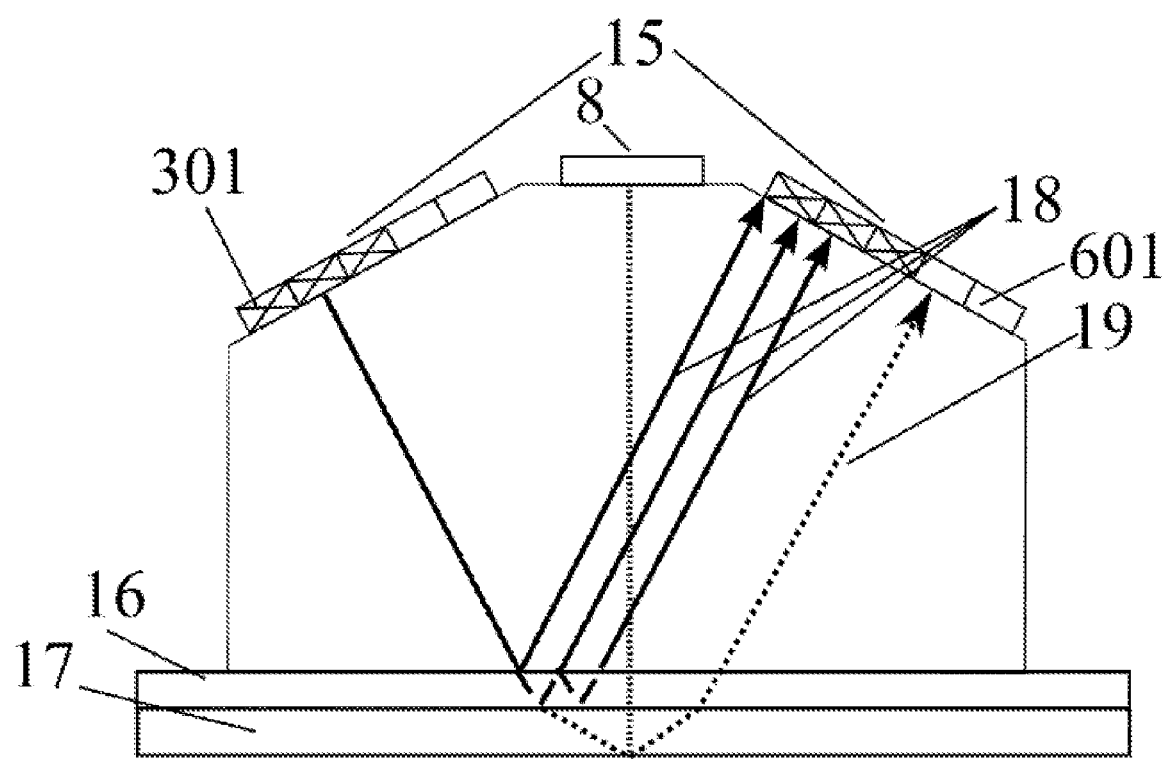
FIG. 5 shows an embodiment of a measuring arrangement for layer thickness determination for a multilayer system.

FIG. 5 shows the measuring arrangement for determining the layer thickness of a multilayer system. The sample 1 depicted consists of two layers 16 and 17 of different materials. The sound transducer 3 with its piezo-elements 301 and the sound transducer 6 with its piezo-elements 601 are arranged as in FIG. 3. In contrast to FIG. 3, individual piezo-elements 301, 601 are switched off, these being provided without crosses in FIG. 5. The sound transducers 3 and 6 are operated such that the piezo-elements 301, 601 marked by crosses are active. This leads to a reduction in the sound transducer surface area of the sound transducers 3 and 6 and to a shift of the sound path 18 to the left. It can be seen that the inevitably excited sound path 19 that leads through the lower layer 17 meets the switched-off piezo-elements 601 of the receiver 6. The method of switching individual piezo-elements 301, 601 on and off that is depicted in exemplary fashion can be used to avoid the superimposition of echo sequences in the "oblique arrangement" in the case of multilayer samples.

Figure 6A:
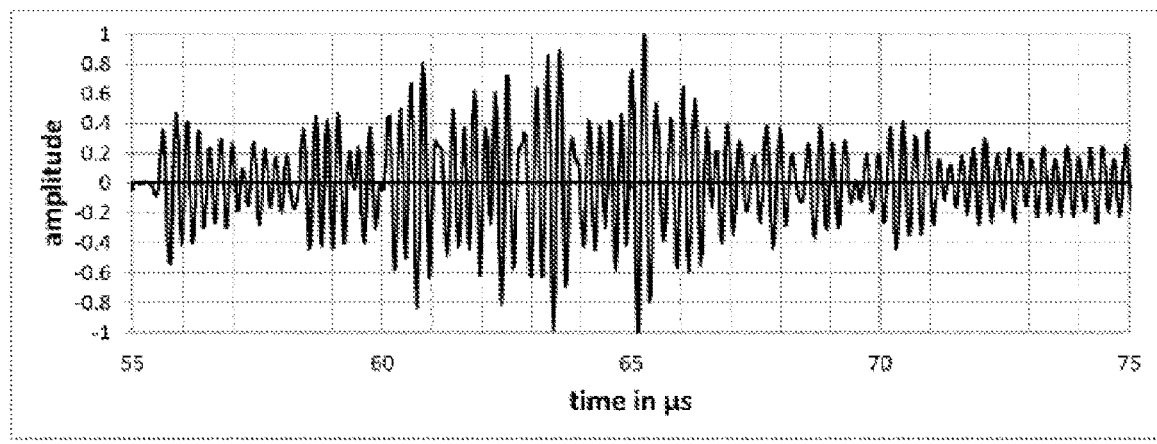
FIG. 6A shows echo sequences for an oblique measurement at an angle with respect to the perpendicular of the sample surface.
Figure 6B:
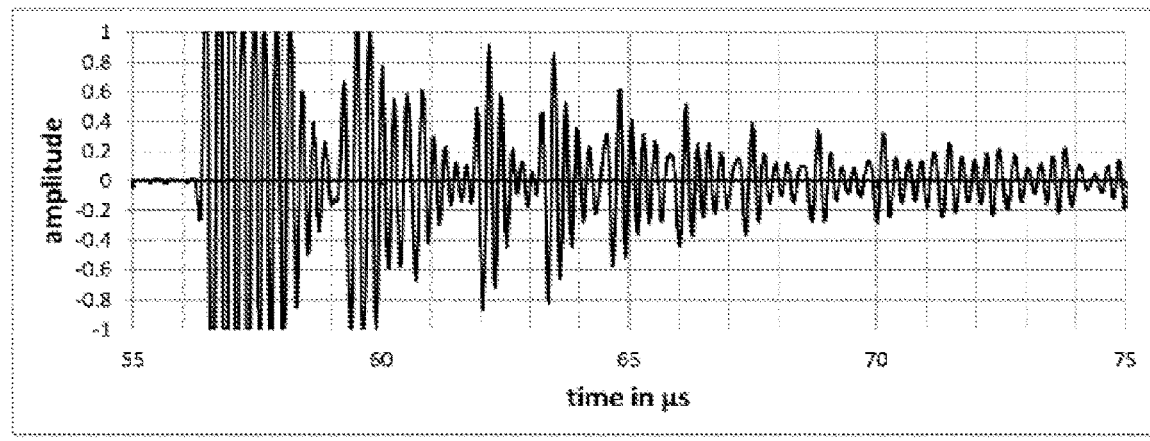
FIG. 6B shows echo sequences for a perpendicular measurement on a steel plate.

FIG. 6A shows the echo sequences for the oblique measurement at a beam angle $\alpha$ of 15° with respect to the perpendicular of the sample surface in exemplary fashion and FIG. 6B shows the echo sequences for a perpendicular measurement on a 4 mm steel plate. The echo sequences shown were picked up using a measuring arrangement as shown in FIG. 3 with a coupling body 2 made from plastic.

Figure 7A:
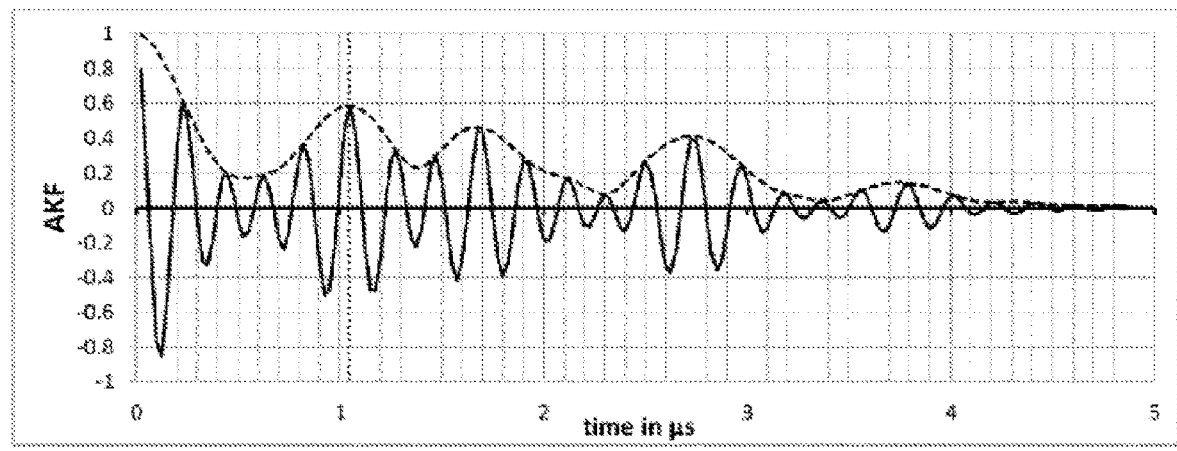
FIG. 7A shows an autocorrelation function of the echo sequences from FIG. 6; and, FIG. 7B shows an autocorrelation function of the echo sequences from FIG. 6B.
Figure 7B:
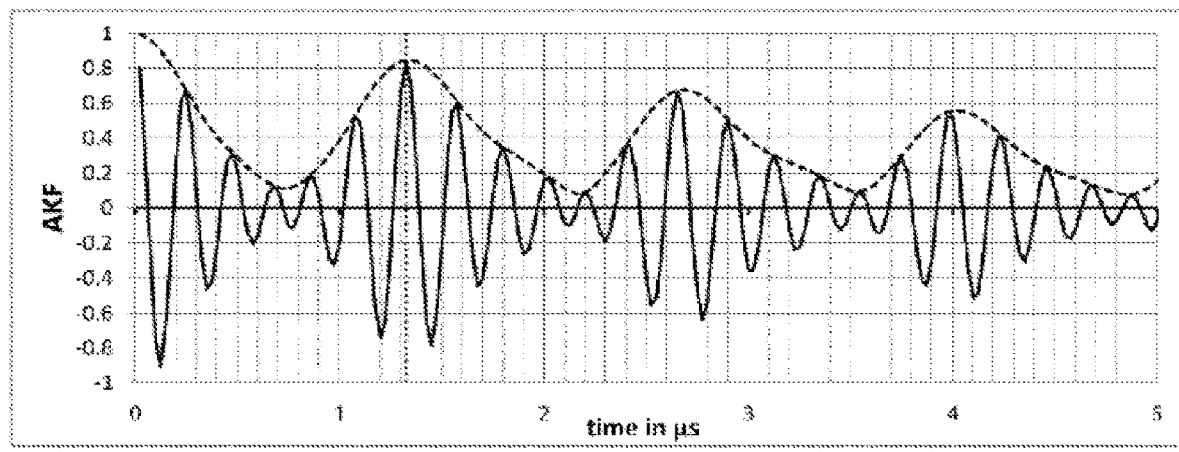

FIG. 7A and FIG. 7B show the autocorrelation functions of the exemplary echo sequences from FIG. 6A and FIG. 6B, which have been windowed beforehand. The secondary maxima marked by a vertical line represent the measured pulse sequence time interval for the respective echo sequence.

The method for determining the layer thickness w and the speed of sound c of a sample 1 is based on the time-of-flight measurement of two ultrasonic signals that have traveled on different sound paths $S_1$ and $S_2$ through the sample 1. The sound paths $S_1$ and $S_2$ are characterized in that they differ in their angle to the sample surface and length, whereas the speed of sound of the ultrasonic waves on the two sound paths $S_1$ and $S_2$ is the same. The sound paths $S_1$ and $S_2$ in the sample 1 can be realized by means of different measuring arrangements. The realization of the time-of-flight measurement of signals on the sound paths $S_1$ and $S_2$ through the sample 1 and the unilateral coupling of the measuring arrangement to the sample 1 are common to the different measuring arrangements.

Two transmitting and receiving sound transducer pairs 3, 6 and 4, 5 that are at different beam angles $\alpha_1$ and $\alpha_2$ with respect to the perpendicular of the sample surface can be used to produce the sound paths $S_1$ and $S_2$ at an angle $\beta_1$ and $\beta_2$, see FIG. 1. This is not the only way of producing them, however. Pairs of transmitters and receivers are not necessary; the transmitting and receiving of the ultrasonic signal can also be realized using a single element if the ultrasonic signal, after passing through the sample 1, is routed back to the sound transducer again by a reflector 7 via the sound path $S_1$ or $S_2$, see FIG. 2. FIG. 3 shows a combination of the measuring arrangements depicted above: transmitter 3 and receiver 6 produce the sound path $S_1$, which runs obliquely through the sample 1 at the angle $\beta_1$, using a pitch-catch configuration. By contrast, sound transducer 8 operates as a transmitter and a receiver in equal measure and produces the sound path $S_2$, which runs perpendicularly ($\beta_2=0$) through the sample. Ultimately, the sound transducers do not need to be put on a common coupling body 2 in order to produce the sound paths $S_1$ and $S_2$. It is also possible for the sound paths $S_1$ and $S_2$ to be produced by separate coupling body units, see FIG. 4: sound path $S_1$ is produced by means of two separate clamp-on flow sensors 13 (pitch-catch configuration) and sound path $S_2$ by means of a sound transducer 14 oriented perpendicularly to the sample surface.

An ultrasonic signal transmitted by the transmitting sound transducer 3, 4 via the coupling body 2 into the sample 1 passes through the sound path $S_1$ or $S_2$ at least once. When the ultrasonic signal leaves the sample 1, the ultrasonic signal is split into two components: one component is transmitted into the coupling body and routed to the receiving sound transducer 5 or 6, and another component is reflected back into the sample 1 and passes through an additional sound path $S_1^*$ or $S_2^*$ (see FIG. 1). $S_1^*$ and $S_2^*$ are sound paths in the sample 1 that are shifted parallel to $S_1$ or $S_2$ and hence have the same length and also the same angle with respect to the perpendicular of the sample surface. The ultrasonic signals that have passed through the sample on the sound paths $S_1^*$ and $S_2^*$ are again split at the interface between coupling body 2 and sample 1 into a transmitted component (which is routed to the receiving sound transducer 5 or 6) and the reflected component, which in turn runs in the sample 1 on a path shifted parallel to $S_1$ or $S_2$.

Below, all sound paths in the sample 1 that have the same length and the same angle to the sample surface as $S_1$ and $S_2$ but are shifted parallel thereto inside the sample on account of a reflection at the interface between coupling body 2 and sample 1 are also referred to as sound path $S_1$ or $S_2$.

The above-described multiple reflections inside the sample 1 mean that the receiving ultrasonic signals consist of the superimposition of multiple signal components that have traveled on a different number of the sound paths $S_1$ and $S_2$ in the sample. The individual signal components therefore have different times of arrival at the receiving sound transducer. The superimposition of the described signal components is referred to as an echo sequence: the signal component that is first in time has never traveled on the sound path $S_1$ or $S_2$ (was reflected by the sample surface and routed to the receiver), the second signal component has traveled on the sound path $S_1$ or $S_2$ once, and later signal components have traveled on sound paths with the length of $S_1$ or $S_2$ repeatedly.

Each time the sample 1 is passed through on sound paths $S_1$ and $S_2$, the time of arrival of the respective signal component at the receiver is delayed by the time-of-flight difference $\Delta t_1$ or $\Delta t_2$. An ultrasonic signal in the form of an echo sequence is therefore obtained at the receiver 5 or 6. The interval of time between the arriving signal components ("echo sequence interval") within the ultrasonic signal over the sound path $S_1$ or $S_2$ is the time-of-flight difference $\Delta t_1$ or $\Delta t_2$. The time-of-flight difference $\Delta t_1$ or $\Delta t_2$ is determined by the layer thickness w of a layer of the sample 1, the speed of sound c in a layer of the sample 1, the speed of sound $c_\alpha$ in the coupling body 2 and the beam angle $\alpha_1$ or $\alpha_2$. The sound paths $S_1$ and $S_2$ themselves are determined by means of the layer thickness w and by means of the law of refraction by means of the beam angle $\alpha_1$ or $\alpha_2$. These angles are known from the configuration of the measuring arrangement. Ultimately, two equations for the two unknowns layer thickness w and speed of sound c can be established on the basis of the measured variables time-of-flight difference $\Delta t_1$ and $\Delta t_2$.

$$c = K_{\alpha_1} K_{\alpha_2} \sqrt{\frac{\Delta t_1^2 - \Delta t_2^2}{K_{\alpha_1} \Delta t_1^2 - K_{\alpha_2}^2 \Delta t_2^2}} \quad (1.1)$$

$$w = \frac{c \, \Delta t_1}{2} \sqrt{1 - \frac{c^2}{K_{\alpha_1}^2}}$$

In this instance, the abbreviated notation $$K_{\alpha_1} = \frac{c_\alpha}{\sin \alpha_1} \quad (1.2)$$
$$K_{\alpha_2} = \frac{c_\alpha}{\sin \alpha_2}$$

is used, where $K_{\alpha_1}$ and $K_{\alpha_2}$ are the sensor constants of the sound transducers in the measuring arrangement at angle $\alpha_1$ or $\alpha_2$ in the coupling body 2, and $\Delta t_1$ is the interval of time between the echoes within the ultrasonic signal over the sound path ($S_1$), $\Delta t_2$ being the interval of time between the echoes within the ultrasonic signal over the sound path ($S_2$). The sensor constants $K_{\alpha_i}$ are defined by means of $$K_{\alpha_i} = \frac{c_\alpha}{\sin \alpha_i}$$

with i={1,2} and $c_\alpha$ speed of sound in the coupling body (2),
$\alpha_t$ angle of the sound ray with respect to the perpendicular in the coupling body (2).

The text below takes the exemplary measuring arrangement from FIG. 3 as a basis for depicting the method and equations for determining the layer thickness w of the sample 1 and the speed of sound c in the sample 1 without prior knowledge of the other variable in more detail. Some of the ultrasonic signals are transmitted into the sample 1 by the transmitting sound transducers 3 or 8 via the coupling body 2 and a suitable coupling means. Some of the ultrasound is reflected to the receiving sound transducer 6 or 8 by the sample surface. In the sample 1, the ultrasonic signal is reflected at least once by the back-wall and then routed back to the receiving sound transducer through the coupling body 2. For the oblique measuring arrangement, the sound paths 10 and 11 result in two temporally successive ultrasonic signals at the receiver 6 and form the echo sequence for the sound path $S_1$. The echo sequence is used to determine the time-of-flight difference $\Delta t_1$ from the interval of time between two pulses. In the perpendicular measuring arrangement, the ultrasonic signal on sound path 9 is repeatedly reflected in the sample 1 and repeatedly passes through the sound path $S_2$. The received signal at the sound transducer 8 is therefore also an echo sequence with the interval of time $\Delta t_2$ between two pulses. The coupling body 2, on which piezo-elements 801, 301 and 601 have been put as sound transducers 8, 3 and 6 in exemplary fashion, can consist of technical plastics such as, for example, polyphenylenesulfide, polyetheretherketone or polyphenylsulfone. Alternatively, a variant with a steel coupling body is conceivable in order to cover increased operating temperatures. The sound transducer 8, consisting of a piezo-element 801, is oriented at the angle 0° with respect to the perpendicular of the sample surface, that is, has been put on the coupling body 2 parallel to the sample surface (perpendicular measurement). The other two sound transducers 3 and 6, which each consists of one or more piezo-elements 203 or 601 in one plane, have been put on the coupling body 2 at an angle to the sample surface that is different than zero, for example at an angle of 16° on a plastic coupling body in order to excite longitudinal waves in a steel sample or at an angle of 40° in order to excite transverse waves in a steel sample (oblique measurement).

So that the speed of sound in the sample 1 is the same on both sound paths $S_1$ and $S_2$, the angle of the oblique arrangement needs to be below the first critical angle as far as possible. If the angle of the oblique measurement is above the first critical angle but below the second critical angle, performance of the method requires a transverse wave perpendicular sound transducer to be used for perpendicular measurement. This is the case for the embodiment depicted in FIG. 4 by means of clamp-on flow sensors 13 and a sample 1 made of steel.

The formulae for the special case of performance using a perpendicular measuring arrangement and an oblique measuring arrangement are disclosed below.

$$c = K_\alpha \sqrt{1 - \left(\frac{\Delta t_\beta}{\Delta t_{perpendicular}}\right)^2} \quad (1.3)$$

$$w = \frac{c \, \Delta t_{perpendicular}}{2}$$

To determine the speed of sound c in the sample 1, the measuring arrangements depicted above ("oblique measurement" and "perpendicular measurement") are used to determine the time-of-flight differences $\Delta t_1$ and $\Delta t_{perpendicular}$. Using the equations from (1.3), these two measured values can be used to determine the speed of sound c and the layer thickness w in the sample 1. Formula (1.3) is obtained as a special case from (1.1) with $\alpha_2=\beta_2=0$ and $\Delta t_2=\Delta t_{perpendicular}$.

$\Delta t_{perpendicular}$ is the time-of-flight difference on the sound path $S_2$ and corresponds to the echo sequence interval between ultrasonic signals that have traveled through the sample 1 and back to the receiver 8 (by means of n back-wall reflections in the sample 1) from the transmitter 8 perpendicularly to the sample surface n times and n+1 times. In the case of perpendicular measurement, the transmitter and the receiver are the same sound transducer. In the case of oblique measurement, the transmitter 3 and the receiver 6 are different sound transducers.

$\Delta t_1$ is the time-of-flight difference on the sound path $S_1$ and corresponds to the echo sequence interval between ultrasonic signals that have traveled through the sample 1 and back to the receiver 6 (by means of n back-wall reflection through the sample 1) from the transmitter 3 at the angle β with respect to the perpendicular of the sample surface n times and n+1 times. Sound paths 10 and 11 are in this instance for n=1.

The echo sequence intervals are determined by using the autocorrelation function from the picked-up echo sequences. FIG. 6B shows the echo sequence for a perpendicular measurement on a steel plate 4 mm thick. If the autocorrelation function is applied to this echo sequence, a first relative maximum (referred to below as first secondary maximum) besides the absolute maximum at 0 is obtained in the autocorrelation function: for the example from FIG. 7B (4 mm steel plate), an echo sequence interval of 1.322 μs is obtained for the perpendicular measurement.

The echo sequence for the oblique measurement in the example from FIG. 6A is not clearly recognizable as a pulse sequence. However, the position of the first secondary maximum is nevertheless evaluable in the autocorrelation function of this echo sequence. If this secondary maximum is not clearly distinguished, the condition that the echo sequence interval from the oblique measurement is shorter than the echo sequence interval in the perpendicular measurement can be used. This condition is used to evaluate the correct secondary maximum in the autocorrelation function of the echo sequence for the oblique measurement. In the example shown, an echo sequence interval of 1.049 μs is ascertained for the oblique measurement. These two measured values, when inserted into the calculation formulae (1.3), result in a speed of sound c of 5996 m/s and a layer thickness w of 3.963 mm.

To determine the individual layer thicknesses w in multilayer systems, each individual layer 16 and 17 of the sample 1 is measured using the method described above. In order to be able to evaluate the times-of-flight from the individual layers 16 and 17, the superimposition of the echo sequences is avoided by switching-on and switching-off of individual piezo-elements 301, 601. FIG. 5 shows in exemplary fashion a measuring arrangement for measuring the layer thicknesses w and speeds of sound c of a two-layer system. The oblique arrangement consists of the sound transducer pair 15, which themselves consist of individual piezo-elements 301 and 601 that are able to be switched on and off. In FIG. 5, the active elements are marked by a cross. First, the upper layer 16 of the sample 1 is measured. Signal components that pass through the lower layer 17 in the sample 1 at least once are moved so far to the right that they strike only the inactive elements of the receiving transducer and are therefore masked. The echo sequence picked up at the receiver therefore contains only signal components from the coupling body 2 and the upper layer 16 of the sample 1. From FIG. 5, it can also be seen that this echo sequence is formed from signal components that have passed through the layer 16 never, once and twice. This echo sequence is used to determine the time-of-flight difference $\Delta t_1$.

The echo sequence from the perpendicular measurement using the sound transducer 8 in FIG. 5 consists of signal components that have traveled on sound paths in both layers 16, 17. They are windowed in such a manner that only signal components from a layer 16 or 17 are taken into consideration for evaluating the time-of-flight difference $\Delta t_{perpendicular}$. To evaluate the layer 16, this is possible for example by virtue of only the first two pulses of the echo sequence being used for evaluation.

Accordingly, formula (1.3) can be used to determine the layer thickness w and the speed of sound c for the upper layer 16 of the sample 1.

In order to measure the lower level 17 of the sample 1, those elements on the receiver of the sound transducer pair 15 that are situated further to the right are activated (depicted without crosses) and the previously activated elements (depicted with a cross) are switched off. An echo sequence consisting of multiple reflections in the lower layer 17 is now picked up (echo sequence consists of signal components that have passed through the layer 17 obliquely at least once) and the pulse sequence time interval on the basis of multiple reflection in layer 17 is evaluated. This is successful only if either further echoes from the upper layer 16 can be largely masked by the change in the receiving transducer surface area or multiple reflections in the upper layer 16 are attenuated to a greater extent than in the lower layer 17. Furthermore, the previously obtained knowledge of the layer thickness of the upper layer 16 can be used to predict the timing of the echoes from the upper layer 16 and hence to remove it from the evaluation of the pulse sequence time intervals for the lower layer 17.

The echo sequence from perpendicular measurement at transducer 8 in FIG. 5 is windowed in such a manner that only signal components from the lower layer 17 that have passed through the layer 17 perpendicularly at least once are taken into consideration for evaluating the time-of-flight difference $\Delta t_{perpendcular}$. As such, for example the first two pulses of the echo sequence can be ignored and only the third and further, subsequent pulses can be used to detennine the time-of-flight difference.

It is understood that the foregoing description is that of the preferred embodiments of the invention and that various changes and modifications may be made thereto without departing from the spirit and scope of the invention as defined in the appended claims.

REFERENCE SIGNS

1 Sample
2 Coupling body
   201 Coupling face
   202 Top face of the coupling body 2
   203, 204, 205, 206 longitudinal lateral edges
3 Sound transducer
   301 Piezo-elements
4 Sound transducer
5 Sound transducer
6 Sound transducer
   601 Piezo-elements
7 Reflectors
8 Sound transducer
   801 Piezo-elements
9 Sound path
10 Sound path
11 Sound path
12 Sound path
13 Sound transducer (clamp-on flow sensors)
   131 Piezo-elements
14 Sound transducer (ultrasonic wall thickness gauge)
   141 Piezo-elements
15 Sound transducer
16 upper layer of the sample 1
17 lower layer of the sample 1
18 Sound path
19 Sound path
$\alpha_1, \alpha_2$ Angle of the sound ray with respect to the perpendicular in the coupling body 2
$\beta_1, \beta_2$ Angle of the sound ray with respect to the perpendicular in the sample 1
$S_1, S_2$ Sound paths in a layer of the sample
$S_1^*, S_2^*$ Sound paths in a layer of the sample, shifted parallel to $S_1, S_2$
$\Delta t_1, \Delta t_2$ Time-of-flight differences in the ultrasound on sound path $S_1, S_2$
$\Delta t_{perpendicular}$ Time-of-flight difference on sound path $S_1$ for the perpendicular measurement
c Speed of sound in the sample 1
$c_\alpha$ Speed of sound in the coupling body 2
w Layer thickness
$K_{\alpha_1}, K_{\alpha_2}$ Sensor constants of the measuring arrangement at angle $\alpha_1$ or $\alpha_2$ in the coupling body 2

What is claimed is:
1. A method for measuring layer thickness (w) and speed of sound (c) for a layer in a single- or multilayer sample via ultrasound, the method comprising:
measuring time-of-flight differences ($\Delta t_1, \Delta t_2$) for ultrasonic signals that travel through the sample on at least two different sound paths ($S_i, S_2$), wherein
the at least two different sound paths ($S_1, S_2$) run at different angles ($\beta_1, \beta_2$) at a matching speed of sound in the layer, wherein the at least two different sound paths ($S_1, S_2$) are produced by virtue of the surface of the single- or multilayer sample having at least one coupling body arranged thereon with at least two sound transceivers configured to transmit the ultrasonic signals into the sample through the coupling body on the at least two different sound paths and receive the ultrasonic signals again, wherein the ultrasonic signals each include a sequence of echoes that arise as a result of multiple reflection inside the sample, wherein the echoes have each traveled on a different number of the at least two different sound paths ($S_i, S_2$) in the sample, wherein
the time-of-flight differences ($\Delta t_1, \Delta t_2$) are the intervals of time between successive echoes, wherein the layer thickness (w) and speed of sound (c) in the layer are deter mined via equations

$$c = K_{\alpha_1} K_{\alpha_2} \sqrt{\frac{\Delta t_1^2 - \Delta t_2^2}{K_{\alpha_1} \Delta t_1^2 - K_{\alpha_2}^2 \Delta t_2^2}}$$

-continued $$w = \frac{c\,\Delta t_1}{2}\sqrt{1 - \frac{c^2}{K_{\alpha_1}^2}}$$

with
- c—speed of sound in a layer of the sample,
- w—layer thickness of a layer of the sample,
- $\Delta t_1$—first interval of time between the echoes within the ultrasonic signal over the sound path ($S_i$),
- $\Delta t_2$—second interval of time between the echoes within the ultrasonic signal over the sound path ($S_2$),
- $K_{\alpha 1}$, $K_{\alpha 2}$—sensor constants of the sound transceivers, wherein the sensor constants ($K_{\alpha i}$) are defined by $$K_{\alpha_i} = \frac{c_\alpha}{\sin \alpha_i}$$

with i={1,2} and
- $c_\alpha$ speed of sound in the coupling body,
- $\alpha_i$ angle of the sound ray with respect to a perpendicular in the coupling body.

2. The method of claim 1, wherein the time of flight differences includes a first time-of-flight difference ($\Delta t_1$) and a second time-of-flight difference ($\Delta t_2$); the at least two sound transceivers include a first sound transceivers, a second sound transceivers, a third sound transceivers and a fourth sound transceivers;
the first time-of-flight difference ($\Delta t_1$) is determined as a position of a first secondary maximum of an autocorrelation function of a first echo sequence, wherein the first echo sequence includes ultrasonic signals that have traveled from the first sound transceivers at the angle ($\beta_1$) with respect to a perpendicular of the sample surface through the layer to be measured in the sample and back to the first sound transceivers or third sound transceivers via n back-wall reflection through the sample at least n times and n+1 times; and, the second time-of-flight difference ($\Delta t_2$) is determined as the position of a first secondary maximum of an autocorrelation function of a second echo sequence, wherein the second echo sequence includes ultrasonic signals that have traveled from the fourth sound transceivers or second sound transceivers at the angle ($\beta_2$) with respect to the perpendicular of the sample surface through the layer to be measured in the sample and back to the fourth sound transceivers, second sound transceivers or third sound transceivers via n back-wall reflection through the sample at least n times and n+1 times.

3. The method of claim 1 further comprising:
switching-on and switching-off of individual piezo-elements of an active sound transceiver surface area of the at least two sound transceivers, which include multiple piezo-elements, so as to cause signal components that pass through the sample on the sound paths ($S_1$, $S_2$) and arrive at the sound transceiver to be selected.

4. The method of claim 3, wherein the sample is a sample having at least two layers; and, the switching-on and switching-off of individual piezo-elements of the active sound transceiver surface area of the at least two sound transceivers results in the layer thickness (w) and the speed of sound (c) being determined for each of the at least two layers.

5. A measuring assembly for measuring layer thickness (w) and speed of sound (c) via ultrasound for a single- or multilayer sample, wherein the sample defines a surface, the measuring assembly comprising:
a single coupling body configured to be arranged on the surface of the sample; and,
at least two sound transceivers arranged on said single coupling body at defined angles and configured such that ultrasound enters the sample through said single coupling body at a beam angle ($\alpha_1$, $\alpha_2$) and passes through at least two sound paths ($S_1$, $S_2$) in a layer of the sample and is reflected back to said at least two sound transceivers at an angle ($\beta_1$, $\beta_2$).

6. The measuring assembly of claim 5, wherein said single coupling body defines a basic shape; said basic shape is a cuboid having an upper top face; and, said upper top face has beveled longitudinal lateral edges.

7. A measuring assembly for measuring layer thickness (w) and speed of sound (c) via ultrasound for a single- or multilayer sample, wherein the sample defines a surface, the measuring assembly comprising:
at least one coupling body configured to be arranged on the surface of the sample;
at least two sound transceivers arranged on said coupling body at defined angles and configured such that ultrasound enters the sample through said coupling body at a beam angle ($\alpha_1$, $\alpha_2$) and passes through at least two sound paths ($S_1$, $S_2$) in a layer of the sample and is reflected back to said at least two sound transceivers at an angle ($\beta_1$, $\beta_2$); and,
a plurality of reflectors configured to be arranged on the sample or on layers of the sample, so that transmitted ultrasonic signals pass through the sample on the sound paths ($S_1$, $S_2$) at least twice and are received again by said at least two sound transceivers.

8. The measuring assembly of claim 5 further comprising:
a third sound transceiver arranged perpendicularly to the sample surface.

9. A measuring assembly for measuring layer thickness (w) and speed of sound (c) via ultrasound for a single- or multilayer sample, wherein the sample defines a surface, the measuring assembly comprising:
at least one coupling body configured to be arranged on the surface of the sample;
at least two sound transceivers arranged on said coupling body at defined angles and configured such that ultrasound enters the sample through said coupling body at a beam angle ($\alpha_1$, $\alpha_2$) and passes through at least two sound paths ($S_1$, $S_2$) in a layer of the sample and is reflected back to said at least two sound transceivers at an angle ($\beta_1$, $\beta_2$);
said at least two sound transceivers including a first sound transceiver and a second sound transceiver, the measuring assembly further comprising:
a third sound transceiver;
said first sound transceiver and said second sound transceiver being configured as clamp-on flow sensors; and,
said third sound transceiver being configured as an ultrasonic wall thickness gauge.

10. A measuring assembly for measuring layer thickness (w) and speed of sound (c) via ultrasound for a single- or multilayer sample, wherein the sample defines a surface, the measuring assembly comprising:
at least one coupling body configured to be arranged on the surface of the sample;
at least two sound transceivers arranged on said coupling body at defined angles and configured such that ultrasound enters the sample through said coupling body at a beam angle ($\alpha_1$, $\alpha_2$) and passes through at least two sound paths ($S_1$, $S_2$) in a layer of the sample and is reflected back to said at least two sound transceivers at an angle ($\beta_1$, $\beta_2$); and, two transmitter/receiver pairs each comprising two sound transceivers being arranged on said coupling body at angles ($\alpha_1$, $\alpha_2$) such that a first transmitter/receiver pair is at a first angle ($\beta_1$) with respect to the sample surface that is different than a second angle ($\beta_2$) of the second transmitter/receiver pair.

11. The measuring assembly of claim 5, wherein said at least two sound transceivers include sound transceiver arrays having at least one piezo-element.

12. A measuring assembly for measuring layer thickness (w) and speed of sound (c) via ultrasound for a single- or multilayer sample, wherein the sample defines a surface, the measuring assembly comprising:
at least one coupling body configured to be arranged on the surface of the sample;
at least two sound transceivers arranged on said coupling body at defined angles and configured such that ultrasound enters the sample through said coupling body at a beam angle ($\alpha_i$, $\alpha_2$) and passes through at least two sound paths ($S_1$, $S_2$) in a layer of the sample and is reflected back to said at least two sound transceivers at an angle ($\beta_1$, $\beta_2$);
said at least two sound transceivers including sound transceiver arrays having at least one piezo-element; and,
said at least two sound transceivers are configured to define an active sound transceiver surface area with multiple piezo-elements via switching-on and switching-off of individual ones of said piezo-elements.

13. The measuring assembly of claim 5, wherein said at least two sound transceivers includes a first sound transceiver configured to transmit ultrasound at a first beam angle $\alpha_1$ through said single coupling body along the first sound path $S_1$; and;
said at least two sound transceivers includes a second sound transceiver configured to transmit ultrasound at a second beam angle $\alpha_2$ through said single coupling body along the second sound path $S_2$.

14. A method for measuring layer thickness (w) and speed of sound (c) for a layer in a single- or multilayer sample via ultrasound, the method comprising:
transmitting ultrasonic signals through a coupling body arranged on a surface of the sample into the sample via at least two sound transceivers, wherein the ultrasonic signals travel through the sample on at least two different sound paths ($S_1$, $S_2$) wherein the sound paths ($S_1$, $S_2$) run at different angles ($\beta_1$, $\beta_2$) at the same speed of sound in the same layer;
receiving the ultrasonic signals again via the at least two sound transceivers, wherein the ultrasonic signals each include a sequence of echoes that arise as a result of multiple reflection inside the sample, wherein the echoes have each traveled on a different number of the at least two different sound paths ($S_1$, $S_2$) in the sample;
determining time-of-flight differences ($\Delta t_1$, $\Delta t_2$) of the ultrasonic signals, wherein the time-of-flight differences ($\Delta t_1$, $\Delta t_2$) are intervals of time between successive echoes; and,
determining the layer thickness (w) and speed of sound (c) in the layer via equations $$c = K_{\alpha_1} K_{\alpha_2} \sqrt{\frac{\Delta t_1^2 - \Delta t_2^2}{K_{\alpha_1}^2 \Delta t_1^2 - K_{\alpha_2}^2 \Delta t_2^2}}$$

$$w = \frac{c\, \Delta t_1}{2} \sqrt{1 - \frac{c^2}{K_{\alpha_1}^2}}$$

with
c—speed of sound in a layer of the sample,
w—layer thickness of a layer of the sample,
$\Delta t_1$—interval of time between the echoes within the ultrasonic signal over the sound path ($S_1$),
$\Delta t_3$—interval of time between the echoes within the ultrasonic signal over the sound path ($S_2$),
$K_{\alpha 1}$, $K_{\alpha 2}$—sensor constants of the sound transceivers
wherein the sensor constants ($K_{\alpha i}$) are defined by means of $$K_{\alpha_i} = \frac{c_\alpha}{\sin \alpha_i}$$

with i={1,2} and
$c_\alpha$ speed of sound in the coupling body,
$\alpha_i$ angle of the sound ray with respect to the perpendicular in the coupling body.

* * * * *

UNITED STATES PATENT AND TRADEMARK OFFICE
CERTIFICATE OF CORRECTION

PATENT NO. : 11,353,348 B2
APPLICATION NO. : 16/845816
DATED : June 7, 2022
INVENTOR(S) : Sven Hans It is certified that error appears in the above-identified patent and that said Letters Patent is hereby corrected as shown below:

In the Specification

In Column 11:
Line 48: delete "detennine" and insert -- determine -- therefor.

In the Claims

In Column 12:
Line 61: delete "deter mined" and insert -- determined -- therefor.

In Column 16:
Line 32: delete "$\Delta t_3$" and insert -- $\Delta t_2$ -- therefor.

Signed and Sealed this
Twentieth Day of September, 2022

*Katherine Kelly Vidal*

Katherine Kelly Vidal
*Director of the United States Patent and Trademark Office*